W. P. WINTER.
AIR PURIFYING APPARATUS.
APPLICATION FILED JULY 30, 1910.
1,009,205.
Patented Nov. 21, 1911.
2 SHEETS—SHEET 1.
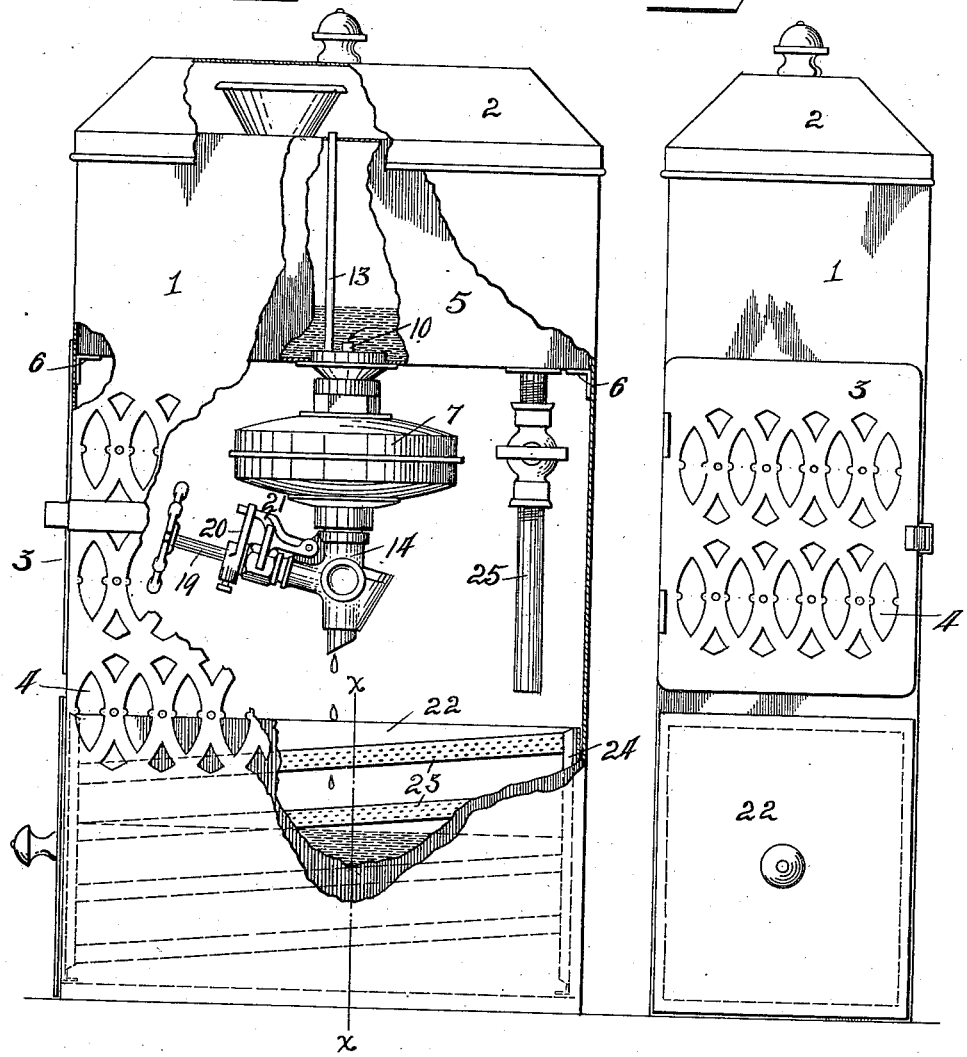
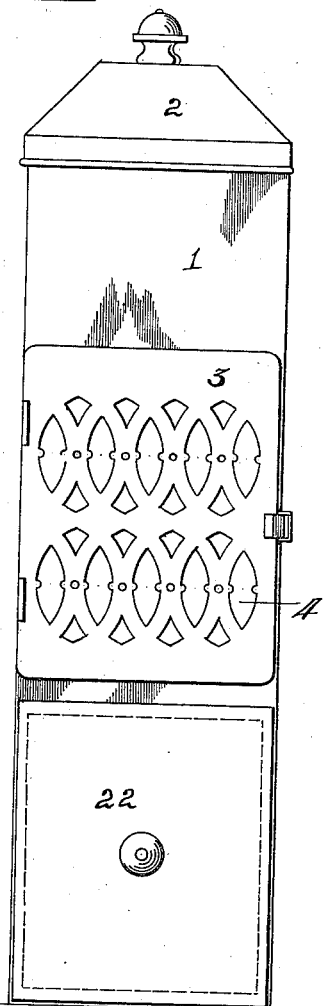
WITNESSES:
C. H. Bills.
E. E. Thomas.
INVENTOR:
Wellington P. Winter,
By Owen & Owen,
His attys.

W. P. WINTER.
AIR PURIFYING APPARATUS.
APPLICATION FILED JULY 30, 1910.
1,009,205.
Patented Nov. 21, 1911.
2 SHEETS—SHEET 2.
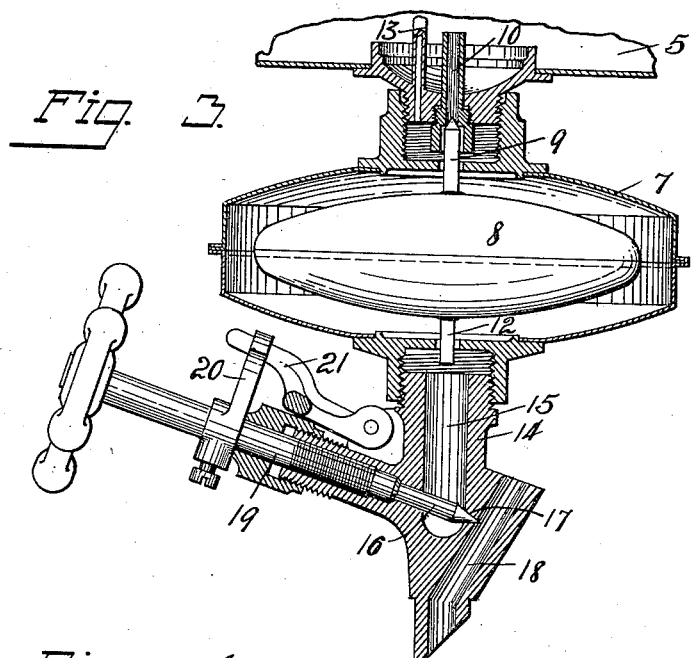
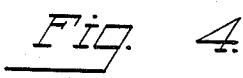
WITNESSES:
INVENTOR.
Wellington P. Winter
By Owen & Owen
His attys.

UNITED STATES PATENT OFFICE.

WELLINGTON P. WINTER, OF TOLEDO, OHIO, ASSIGNOR OF ONE-HALF TO ORVILLE S. BRUMBACK, OF TOLEDO, OHIO.

AIR-PURIFYING APPARATUS.

1,009,205.  Specification of Letters Patent.  Patented Nov. 21, 1911.

Application filed July 30, 1910. Serial No. 574,744.

*To all whom it may concern:*

Be it known that I, WELLINGTON P. WINTER, a citizen of the United States, and a resident of Toledo, in the county of Lucas and State of Ohio, have invented a certain new and useful Air - Purifying Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an apparatus for slowly applying a liquid to a disinfectant or air purifying powder or other substance to dissolve it or effect a chemical change thereof, but is not restricted to such use as it may be used in any connection for which it may be adapted or appropriate.

The object of my invention is the provision of an apparatus of this class, which is simple and efficient in its construction and capable of regulation to permit a steady and positive dropping of liquid into a subjacent receptacle at predetermined intervals as the nature of the substance acted on or the conditions of use may require.

The invention is fully described in the following specification, and while, in its broader aspect, it is capable of embodiment in numerous forms, a preferred embodiment thereof is illustrated in the accompanying drawings, in which,—

Figure 1 is a front elevation of such apparatus with portions broken away. Fig. 2 is an end view thereof. Fig. 3 is an enlarged sectional view of a portion of the liquid storage tank and attached dropping parts, and Fig. 4 is a cross-section taken on the line $x$, $x$ in Fig. 1 of the receptacle into which the liquid drops and chemically acts on a substance contained therein.

Referring to the drawings, 1 designates a case or housing in which the operative parts of the apparatus are disposed, such case having its upper end open and provided with a removable cover 2 and one side provided with a door 3 to afford access to the interior thereof. This case also has its sides or a portion of them provided with openings 4 for the passage therethrough of the generated fumes, vapors or purified air to permit the dissipation thereof into the surrounding atmosphere.

A tank or liquid receptacle 5 is mounted within the upper open end of the case 1, being supported in elevated position therein by ledges 6, or in any other suitable manner. Suspended from the bottom of the tank 5 and in communication therewith is a supplemental liquid receptacle or float-chamber 7 in which is located a float 8. This float has a valve-stem 9 rising therefrom in position to seat, upon a raising of the float, against a coöperating valve seat at the lower end of a passage or tube 10, which opens communication between the tank 5 and float-chamber. The vertical movements of the float 8 are guided by the valve-stem 9 and a stem 12 on the under side of the float, which work respectively, through registering openings provided in the upper and lower walls of the float-chamber, which openings are shown in the present instance as forming the inlet and outlet openings of such chamber. An air-vent tube 13 passes through the tank 5 and opens communication between the atmosphere and the upper portion of the float-chamber 7.

14 designates a drip-cock, which is threaded or otherwise suitably secured to the under side of the float-chamber 7 with the portion 15 of its throat in constant communication with the interior of such chamber, as shown.

A needle-valve 16 is carried by the cock and seats in an opening 17 between the lower end of the portion 15 of the cock throat and a drip-passage 18 of the cock whereby to regulate to a nicety the flow of liquid into such drip-passage. The stem 19 of the needle-valve is threaded in a portion of the cock and carries a finger 20, which coacts with a pivoted stop 21 at a predetermined point in each revolution to stop the rotation of the valve. The valve is adapted upon each complete turn to permit an emission of a predetermined number of drops per minute from the cock. The drip-passage 18 has the portion thereof into which the opening 17 leads preferably inclined from a vertical plane and opening both at its top and bottom to the atmosphere, thus permitting atmospheric air to enter such passage above said opening 17, as shown. It has been found by experimenting that the opening of the passage 18 to the atmosphere above the opening 17 effects a more efficient and regular dropping of the liquid than would otherwise be the case.

A tank or pan 22 is located in the bottom of the case 1 in position to receive the drippings from the drip-cock 14 and is shown in the present instance as being inserted in and withdrawn from the interior of the case through an opening in one side thereof, which opening is closed by the outer end of the pan when in position within the case, as shown in Figs. 1 and 2. The pan 22 is shown in the present instance as having a plurality of perforated or porous trays or pan-like shelves 23 mounted therein in different vertical planes with which a liquid successively moves into contact as it rises within the pan 22. These pans are shown as being arranged in alternate order at opposite sides of the pan 22 and are preferably inclined so that each pan is gradually submerged from one end to the other thereof as the liquid rises within the tank. This also enables the liquid to rise into contact with the lower end of each pan at approximately the time of complete submergence of the elevated end of the pan disposed in the next subjacent plane. The trays or shelves 23 are intended to hold a powder or other substance which upon the contact therewith of a liquid, for instance, such as water, chemically acts to either purify the surrounding atmosphere or to kill obnoxious odors. The trays 23 are secured at their ends to standards 24 and the whole is easily removable from the pan 22 for cleaning, or the like.

25 designates a valved drain-tube which projects from the bottom of the tank 5 adjacent one end thereof.

The apparatus was designed more particularly for slowly applying a liquid to a powder or chemical which is made active for the purifying of air, the killing of obnoxious odors or for disinfecting purposes by the contact of a liquid therewith. It will be understood, however, that the apparatus is not restricted for use in such connection as it may be used for whatever purpose it may be adapted or appropriate.

In the use of my apparatus, a powder or other agent to be chemically acted on by the application of liquid thereto is placed within the trays or shelves 23 throughout their length and a quantity of the desired liquid placed within the tank 5, which is removably located in the upper portion of the case 1 above the pan 22 containing the trays or shelves 23. The liquid is permitted to flow from the tank 5 into the float-chamber 7 until sufficient quantity has entered such chamber to raise the float 8 to effect a seating of the valve 9, the float and its valve thus acting to regulate the flow of liquid to the float-chamber and to relieve the liquid within such chamber from the weight and consequent pressure of the liquid within the tank 1 when the float valve is seated. It is thus evident that the quantity and pressure of the liquid within the float-chamber remains approximately constant during the running of the apparatus irrespective of the quantity of liquid within the tank 5. The needle-valve 16 of the drip-cock being opened to the desired extent, the liquid flows slowly in drop form from the cock-throat 15 into the drip passage 18 where the air acts thereon to facilitate its regular dropping action. As the liquid drips into the subjacent pan 22 it slowly rises therein and effects a gradual submersion of the successive trays or shelves 23 from one end to another thereof, as is apparent. As the liquid makes contact with the chemical within the trays 23 a chemical action takes place which throws off a gas or vapor for commingling with the surrounding air to purify it or counteract the ill or disagreeable effect of odors or other germs floating in the air.

I wish it understood that my invention is not limited to any specific construction or arrangement of the parts except in so far as such limitations are specified in the claims.

Having thus described my invention, what I claim as new and desire to secure by Letters Patent, is,—

1. In an air purifying apparatus, the combination of a receptacle having sets of vertically arranged trays disposed therein on opposite sides thereof and forming a space between them, the trays of each set being perforated and inclined, and means for permitting a predetermined dropping of liquid in the space between said trays, substantially as described.

2. In an apparatus of the class described, the combination of a receptacle having a plurality of perforated trays therein, said trays being arranged in different vertically spaced planes in alternate relation on opposite side portions of such receptacle, and means for permitting a predetermined dropping of liquid within the receptacle.

3. In an apparatus of the class described, the combination of a tank, a float-chamber in communication with the lower portion of such tank, a float disposed within said chamber and having a part operative to close the communication between the tank and chamber upon a rising of the float within the chamber, a valve-controlled drip-cock attached to the lower portion of such chamber, and a receptacle disposed beneath said drip-cock and having shelves arranged in different vertically spaced planes therein.

4. In an apparatus of the class described, a liquid tank, a float chamber in communication therewith, float means within such chamber for closing said communication, and a drip-cock having its throat in communication with said chamber and having a drip passage in valve controlled communication with said throat, said passage being open at both ends to the atmosphere.

5. In an apparatus of the class described, a liquid tank, a float chamber in communication therewith, float means within such chamber for closing said communication, said chamber having a vent opening communication between its upper portion and the atmosphere, and a drip-cock attached to such chamber and having a drip passage in valve controlled communication with said chamber, said passage being open to the atmosphere above and below its point of communication with said chamber.

6. In an apparatus of the class described, a liquid tank, a float chamber in communication therewith, float means within such chamber for closing said communication, a drip-cock having its throat in communication with said chamber and having a drip passage in valve-controlled communication with such throat, said passage having its major portion on an incline relative to a vertical plane and being open to the atmosphere at opposite sides of its point of communication with said throat.

7. In an apparatus of the class described, the combination of a case having a portion at least of its walls provided with openings, a tank disposed in the upper portion of such case, a float-chamber at the bottom of such tank in communication with the interior thereof, float means within such chamber for closing such communication upon a predetermined rising of liquid within the chamber, said chamber having a vent opening communication between its upper portion and the atmosphere, a drip-cock attached to such chamber and having a drip passage in lateral valve-controlled communication with the chamber, said passage being open to the atmosphere above and below its point of communication with said chamber, and a receptacle disposed within the case beneath such drip-cock for catching the drippings therefrom, said receptacle having shelves arranged in different vertically spaced planes therein.

In testimony whereof, I have hereunto signed my name to this specification in the presence of two subscribing witnesses.

WELLINGTON P. WINTER.

Witnesses:
O. S. BRUMBACK,
A. D. BISCHOFF.

Copies of this patent may be obtained for five cents each, by addressing the "Commissioner of Patents, Washington, D. C."